US009523398B2

(12) United States Patent
Kato (10) Patent No.: US 9,523,398 B2
(45) Date of Patent: Dec. 20, 2016

(54) CLUTCH DEVICE (71) Applicant: UNIVANCE CORPORATION, Kosai, Shizuoka (JP)

(72) Inventor: Tadahiko Kato, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 130 days.

(21) Appl. No.: 14/388,750

(22) PCT Filed: Mar. 26, 2013

(86) PCT No.: PCT/JP2013/058766
§ 371 (c)(1),
(2) Date: Jan. 7, 2015

(87) PCT Pub. No.: WO2013/146776
PCT Pub. Date: Oct. 3, 2013

(65) Prior Publication Data
US 2015/0135874 A1 May 21, 2015

(30) Foreign Application Priority Data

Mar. 28, 2012 (JP) .................................. 2012-073099

(51) Int. Cl.
*F16D 41/061* (2006.01)
*F16D 7/00* (2006.01)
(Continued)

(52) U.S. Cl.
CPC ............. *F16D 41/061* (2013.01); *F16D 7/007* (2013.01); *F16D 41/067* (2013.01);
(Continued)

(58) Field of Classification Search
CPC ...... F16D 14/061; F16D 14/067; F16D 7/007; F16D 43/218; F16D 15/00; F16D 47/04; F16D 41/02; F16D 41/08; F16D 41/06; F16D 41/07; F16D 7/10; F16H 1/003; Y10T 74/19614; F15D 41/061; F15D 41/064
See application file for complete search history.

(56) References Cited

U.S. PATENT DOCUMENTS 5,035,309 A * 7/1991 Takada .................. F16D 41/061
192/41 R
5,109,964 A 5/1992 Fukui et al.
(Continued)

FOREIGN PATENT DOCUMENTS

DE 10 2008 060 959 A1 6/2010
JP 03-204418 A 9/1991
(Continued)

OTHER PUBLICATIONS

Takada Nobuo. ON-OFF Type Torque Limiter. Jan. 9, 1996. JPO. Machine Translation.*
(Continued)

*Primary Examiner* — Huan Le
*Assistant Examiner* — Lori Wu
(74) *Attorney, Agent, or Firm* — Westerman, Hattori, Daniels & Adrian, LLP (57) ABSTRACT

Provided is a clutch device capable of reliably transmitting predetermined torque. Power is transmitted from an outer ring to a second gear through a first gear. The teeth of the first gear are formed so that the lines of the teeth are non-parallel to the center axis. The direction of axial force generated by the reaction force of the second gear and acting on the first gear is set to be the same as the direction of movement of the outer ring. When rollers engage with raceway surfaces and power is transmitted from the first gear to the second gear, the reaction force of the second gear promotes the movement of the outer ring in the axial direction. Predetermined torque can be reliably transmitted (Continued)

because axial pull-in force between an inner ring and the outer ring increases.

4 Claims, 5 Drawing Sheets

(51) Int. Cl.
*F16D 41/067* (2006.01)
*F16D 43/21* (2006.01)
*F16H 1/00* (2006.01)
*F16D 15/00* (2006.01)

(52) U.S. Cl.
CPC ........... *F16D 43/218* (2013.01); *F16H 1/003* (2013.01); *F16D 15/00* (2013.01); *Y10T 74/19614* (2015.01)

(56) References Cited

U.S. PATENT DOCUMENTS

| | | | | |
|---|---|---|---|---|
| 5,211,273 A | * | 5/1993 | Castens | F16D 41/061 192/45.017 |
| 5,328,012 A | * | 7/1994 | Takata | F16D 41/061 192/45.006 |
| 5,520,273 A | * | 5/1996 | Moribayashi | F16D 41/061 188/82.84 |
| 5,720,371 A | * | 2/1998 | Kimura | F16D 25/06 192/38 |
| 5,850,897 A | * | 12/1998 | Kimura | F16D 41/061 192/3.3 |
| 6,056,664 A | * | 5/2000 | Mimura | F16H 48/22 475/246 |
| 6,591,800 B1 | * | 7/2003 | Methley | F01L 1/344 123/90.15 |
| 6,932,205 B2 | * | 8/2005 | Kurita | E05F 15/603 192/44 |
| 2008/0011574 A1 | * | 1/2008 | Yamasaki | F16D 13/52 192/70.28 |

FOREIGN PATENT DOCUMENTS

| | | | | |
|---|---|---|---|---|
| JP | 03-244832 A | 10/1991 | | |
| JP | 3-244832 A | 10/1991 | | |
| JP | 03-260422 A | 11/1991 | | |
| JP | 06-173976 A | 6/1994 | | |
| JP | 8-4792 A | 1/1996 | | |
| JP | 08-004792 A | 1/1996 | | |
| JP | CA 2311552 A1 | * | 12/2000 | ............. F16D 7/007 |

OTHER PUBLICATIONS

Sawa Shiro. Clutch Bearing. Oct. 31, 1991. JPO. Machine Translation.*
Fukui Satoru. Rolling Clutch. Nov. 20, 1991. JPO. Machine Translation.*
Notification of Transmittal of Copies of Translation of The International Preliminary Report on Patentability (Form PCT/IB/338) of International Application No. PCT/JP2013/058766 mailed Oct. 9, 2014 with Forms PCT/IB/373 and PCT/ISA/237 (7 pages).
Extended European Search Report dated Dec. 1, 2015, issued in counterpart European Application No. 13768380.1 (6 pages).
International Search Report dated Apr. 23, 2013, issued in corresponding application No. PCT/JP2013/058766.

* cited by examiner

CLUTCH DEVICE

TECHNICAL FIELD

The present invention relates to clutch devices, and more particularly, to a clutch device capable of properly transmitting a predetermined torque.

BACKGROUND ART

A clutch device having a plurality of rollers disposed on a track formed between an input rotary member and an output rotary member is conventionally known (Patent Literature 1). The clutch device disclosed in Patent Literature 1 is configured so that the rollers are tilted with respect to a plane including a central axis, and that the output rotary member (outer ring) is allowed to move in the axial direction. When the input rotary member (inner ring) relatively rotates in a predetermined direction with respect to the output rotary member (outer ring), the force of the rollers acts to pull the input rotary member and the output rotary member toward each other (the force of decreasing the distance between tracks) moves the output rotary member in the axial direction. This causes the rollers to become engaged, thereby transmitting motive power to the output rotary member. When, on the other hand, the input rotary member relatively rotates in an opposite direction with respect to the output rotary member, the force of the rollers acts to pull the input rotary member and the output rotary member away from each other (the force of increasing the distance between tracks) moves the output rotary member in the axial direction. This causes the rollers to become disengaged, thereby causing the input rotary member and the output rotary member to rotate relatively (rotate freely).

CITATION LIST

Patent Literature

Patent Literature 1: JP-A No. 1994-173976

SUMMARY OF INVENTION

Technical Problem

However, when the above conventional technology is used to engage the rollers with an input track surface and with an output track surface, the axial force of pulling the input rotary member and the output rotary member toward each other is suppressed by the axial component force of friction force generated between the rollers and the input and output track surfaces. Therefore, the distance between the input track surface and the output track surface cannot be sufficiently decreased. This may result in the failure to transmit a predetermined torque.

The present invention has been made to solve the above problem. An object of the present invention is to provide a clutch device capable of properly transmitting a predetermined torque.

Solution to Problem and Advantageous Effects of Invention

In accomplishing the above object, according to a clutch device described in a first aspect of the present invention, an output rotary member is capable of relatively moving in the axial direction with respect to an input rotary member, and an output track surface is formed on one of inner and outer circumferential surfaces of the output rotary member. An input track surface is formed on one of inner and outer circumferential surfaces of the input rotary member and disposed opposite the output track surface. A plurality of rollers are disposed between the input track surface and the output track surface. The rollers are tilted at a predetermined angle from a plane including a central axis of the input rotary member. Therefore, when the input rotary member rotates in a predetermined direction, the rollers are guided by the input and output track surfaces to orbit the central axis while rotating on their own axis. The input rotary member and the output rotary member are guided by the rotation of the rollers to elastically deform and move relatively in the axial direction in such a manner as to decrease the distance between the input and output track surfaces. As a result, the rollers engage with the input and output track surfaces so that the input rotary member transmits motive power to the output rotary member.

The motive power transmitted to the output rotary member is transmitted to a first gear, which is formed integrally with or coupled to the output rotary member. The motive power is then transmitted to a second gear, which engages with the first gear. When, in a situation where the first gear is formed integrally with or coupled to the input rotary member, the motive power is input to the first gear from the second gear, which engages with the first gear, the input rotary member rotates. The first gear is toothed so that its tooth trace is non-parallel to the central axis. The axial force exerted on the first gear due to the reaction force of the second gear is oriented in the same direction as the axial direction in which the input or output rotary member moves to decrease the distance between the input and output track surfaces. Therefore, when the rollers engage with the input and output track surfaces to transmit the motive power from the first gear to the second gear, the reaction force of the second gear prompts the input or output rotary member to move in the axial direction so as to decrease the distance between the input and output track surfaces. This increases the axial force of pulling the input and output rotary members toward each other. Consequently, a predetermined torque can be properly transmitted.

According to the clutch device described in a second aspect of the present invention, the first gear is set so that the absolute value of axial force exerted on the first gear due to the reaction force of the second gear is greater than the absolute value of axial component force of friction force that is exerted in a direction opposite the direction of the axial force due to friction between tooth surfaces of the first and second gears. This prevents the friction between the tooth surfaces of the first and second gears from suppressing the axial force of pulling the input and output rotary members toward each other. As a result, a predetermined torque can be properly transmitted while the advantageous effect described in the first aspect is obtained.

According to the clutch device described in a third aspect of the present invention, a transport means transports the input rotary member or the output rotary member to an axial position at which the rollers cannot engage with the input and output track surfaces. This prevents the input rotary member from transmitting the motive power to the output rotary member. As a result, the motive power transmission from the input rotary member to the output rotary member can be blocked while the advantageous effect described in the first or second aspect is obtained.

According to the clutch device described in a fourth aspect of the present invention, the axis line of a rotation shaft of the second gear does not coincide with the central axis. Therefore, the turning radius of the second gear can be decreased. As a result, the size of the clutch device can be reduced while the advantageous effect described in the first, second, or third aspect is obtained.

DESCRIPTION OF EMBODIMENTS

Figure 1:
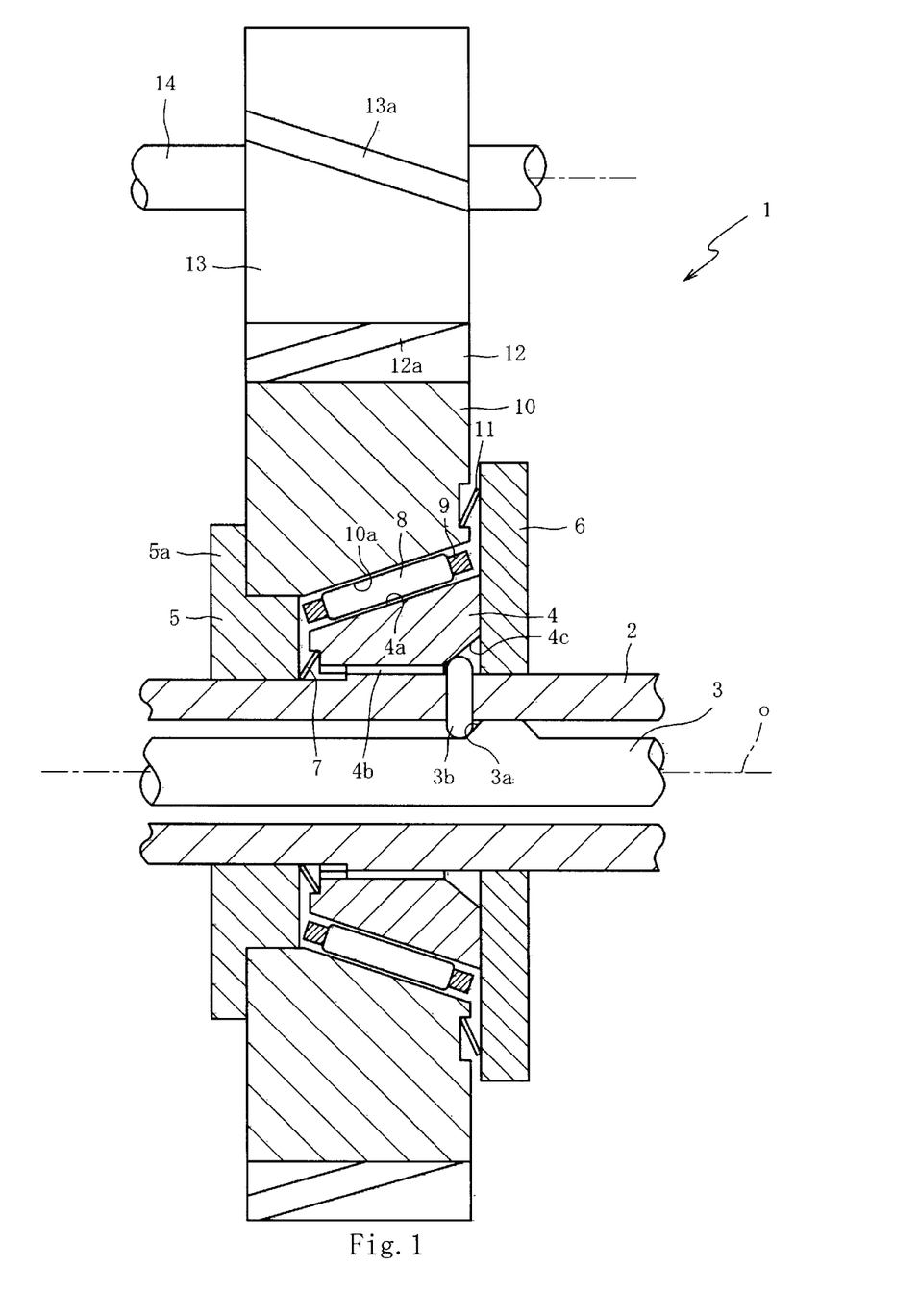
FIG. 1 is an axial cross-sectional view of a clutch device according to a first embodiment.
Figure 2:
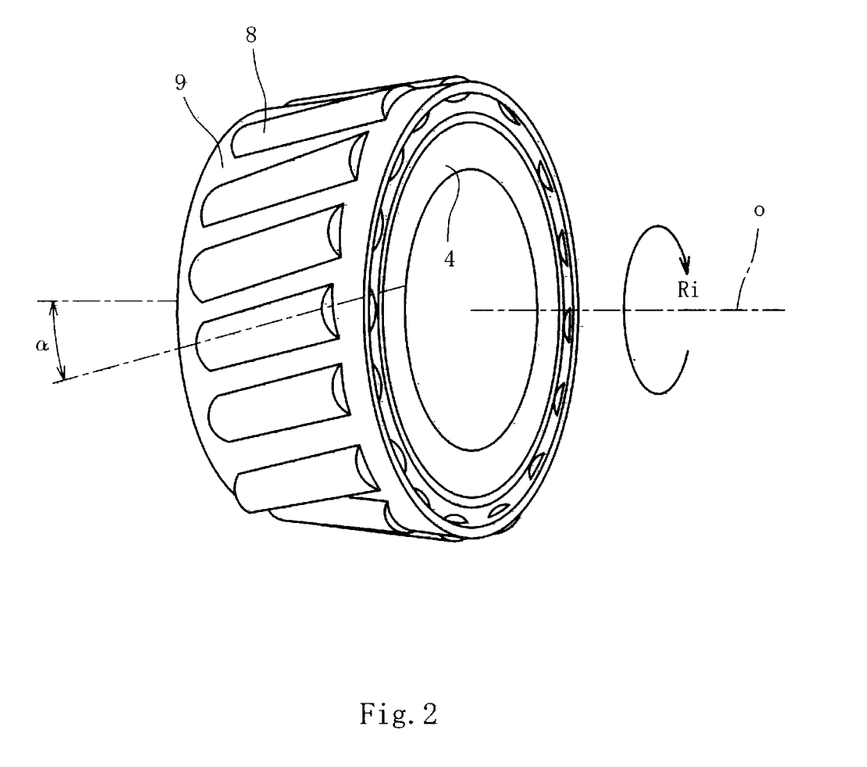
FIG. 2 is a perspective view of an input rotary member and a retainer, illustrating the arrangement of rollers.

Hereinafter, embodiments of the present invention will be described with reference to the accompanying drawings. FIG. 1 is an axial cross-sectional view of a clutch device 1 according to a first embodiment of the present invention. FIG. 2 is a perspective view of an inner ring 4 (input rotary member) and a retainer 9, illustrating the arrangement of rollers 8. FIG. 1 shows a mechanism that transmits motive power from the inner ring 4 to an outer ring 10, but does not show, for example, a thrust bearing that receives axial force. Further, FIG. 1 does not show some portions of teeth 12a and 13a that are respectively formed on a first gear 12 and a second gear 13.

As shown in FIG. 1, the clutch device 1 mainly includes the inner ring 4, which acts as an input rotary member; the outer ring 10, which is disposed toward the outer circumference of the inner ring 4 to act as an output rotary member; the rollers 8, which are disposed between the inner ring 4 and the outer ring 10; the first gear 12, which rotates together with the outer ring 10; and the second gear 13, which engages with the first gear 12.

The inner ring 4 has a function of transmitting the rotary power of an input shaft 2 to the outer ring 10. An input track surface 4a, which is a one-sheeted hyperboloid around a central axis o, is formed on the outer circumferential surface of the inner ring 4. Although a spline 4b inhibits the inner ring 4 from rotating relative to the input shaft 2, the inner ring 4 is allowed to move axially relative to the input shaft 2. Stoppers 5 and 6 inhibit the inner ring 4 from axially moving more than a predetermined distance. The stoppers 5 and 6 are positioned at a predetermined distance from the axial end face of the inner ring 4 and mounted on the outer circumference of the input shaft 2 to protrude outward in the axial direction from the axial end face of the inner ring 4. A disc spring 7 disposed between the stopper 5 and the inner ring 4 presses the inner ring 4 in one axial direction (rightward in FIG. 1) to bring the axial end face into contact with the stopper 6.

A camshaft 3 is axially inserted into the input shaft 2. As a drive device (not shown) moves the camshaft 3 in the axial direction, a cam face 3a formed on the outer circumference of the camshaft 3 causes a pin 3b to appear on the outer circumference of the input shaft 2. The pin 3b is radially inserted into the input shaft 2. When the cam face 3a pushes the pin 3b upward until its leading end protrudes from the outer circumference of the input shaft 2, the leading end is pressed against a tilted surface 4c formed on the inner circumferential surface of the inner ring 4. The axial force of the inner ring 4 that is generated when the pin 3b is pressed against the tilted surface 4c of the inner ring 4 is set to be greater than the pressing force (axial force) of the disc spring 7. Therefore, the inner ring 4 moves toward the stopper 5 (leftward in FIG. 1) against the pressing force of the disc spring 7.

The outer ring 10 operates together with the inner ring 4 to perform a function of transmitting the motive power of the input shaft 2 to the first gear 12. An output track surface 10a, which is a one-sheeted hyperboloid around the central axis o, is formed on the inner circumferential surface of the outer ring 10. The outer ring 10 is capable of rotating relative to the inner ring 4 and relatively moving in the axial direction. The stopper 6 and a brim 5a protruding from the stopper 5 inhibit the outer ring 10 from axially moving beyond a predetermined amount. When the rollers 8 are engaged and screwed into the input track surface 4a and the output track surface 10a, the stoppers 5 and 6 have a torque limiter function of stopping the axial movement of the inner ring 4 and of the outer ring 10 at a fixed position to prevent the application of torque higher than a predetermined level, and a function of preventing the rollers 8 from slipping out. A disc spring 11 disposed between the stopper 6 and the outer ring 10 presses the outer ring 10 in the other axial direction (leftward in FIG. 1) so that its axial end face comes into contact with the brim 5a. The disc spring 11 presses the outer ring 10 in such a manner as to increase the distance between the input track surface 4a and the output track surface 10a.

As shown in FIG. 2, the rollers 8 are formed into a cylindrical shape and retained between the input track surface 4a and the output track surface 10a by the retainer 9. The retainer 9 retains the rollers 8 so that the rollers 8 are spaced apart from each other to smoothly rotate without interfering with each other. The rollers 8 are tilted at a predetermined angle $\alpha$ (for example, 15°) from a plane including the central axis o and circumferentially disposed on the input track surface 4a and the output track surface 10a so that the outer circumferential surface of the rollers 8 is able to come into linear contact with the input track surface 4a and the output track surface 10a.

Returning to FIG. 1, the first gear 12 operates so that the motive power transmitted to the outer ring 10 is transmitted to the second gear 13, which engages with the first gear 12. The first gear 12 is disposed on the outer circumferential surface of the outer ring 10 and formed integrally with or coupled to the outer ring 10. Further, the first gear 12 has a plurality of teeth 12a on its outer circumferential surface, and is formed so that its tooth trace is non-parallel to the central axis o. Similarly, the second gear 13 has a plurality of teeth 13a on its outer circumferential surface, and is formed so that its tooth trace is non-parallel to the central axis o. In the first embodiment, the first gear 12 and the second gear 13 are formed as a pair of helical gears that engage with each other. The axis line of a rotation shaft 14 of the second gear 13 does not coincide with the central axis o. Further, the rotation shaft 14 of the second gear 13 is disposed in parallel with the central axis o. The second gear 13 may include a plurality of pinion gears with a ring gear (internally toothed) disposed on the outer circumference of the second gear 13 to form a planetary gear train.

The distance between the stoppers 5 and 6 and the brim 5a is set so that the pressing force of the disc springs 7 and 11 brings the axial end face of the inner ring 4 into contact with the stopper 6, and that the outer circumferential surface of the rollers 8 does not come into contact with at least one of the input track surface 4a and the output track surface 10a when the axial end face of the outer ring 10 is in contact with the brim 5a. In the above instance, the rollers 8 cannot engage with the input track surface 4a and the output track surface 10a. Setup is also performed so that when, on the other hand, the camshaft 3 is moved in one axial direction (leftward in FIG. 1) to move the inner ring 4 toward the stopper 5 against the pressing force of the disc spring 7, the distance between the input track surface 4a and the output track surface 10a decreases to bring the rollers 8 into linear contact with the input track surface 4a and the output track surface 10a.

Figure 3A:
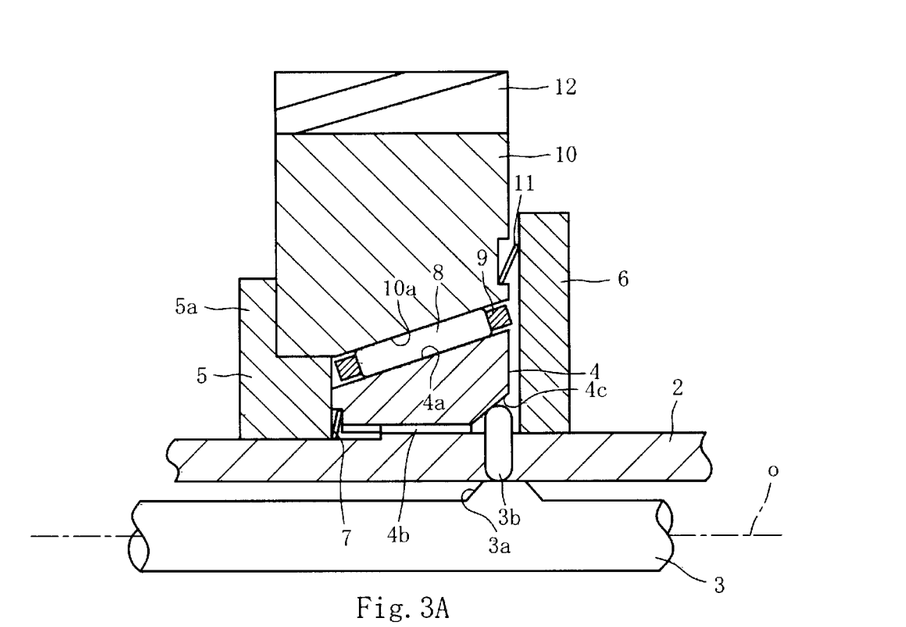
FIG. 3(a) is a half sectional view of the clutch device viewed with the input rotary member moved in the axial direction.
Figure 3B:
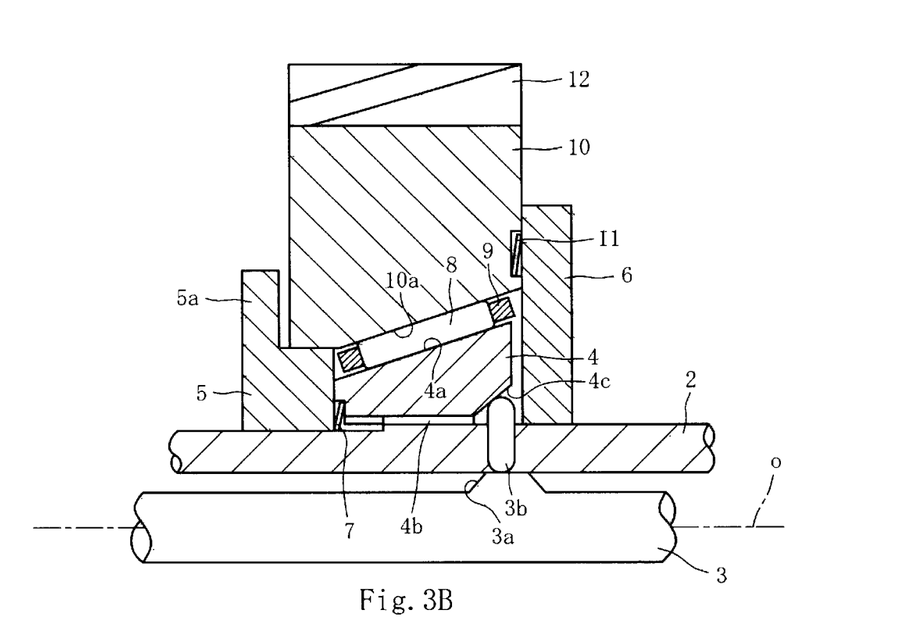
FIG. 3(b) is a half sectional view of the clutch device viewed with the rollers engaged.
Figures 4A, 4B:
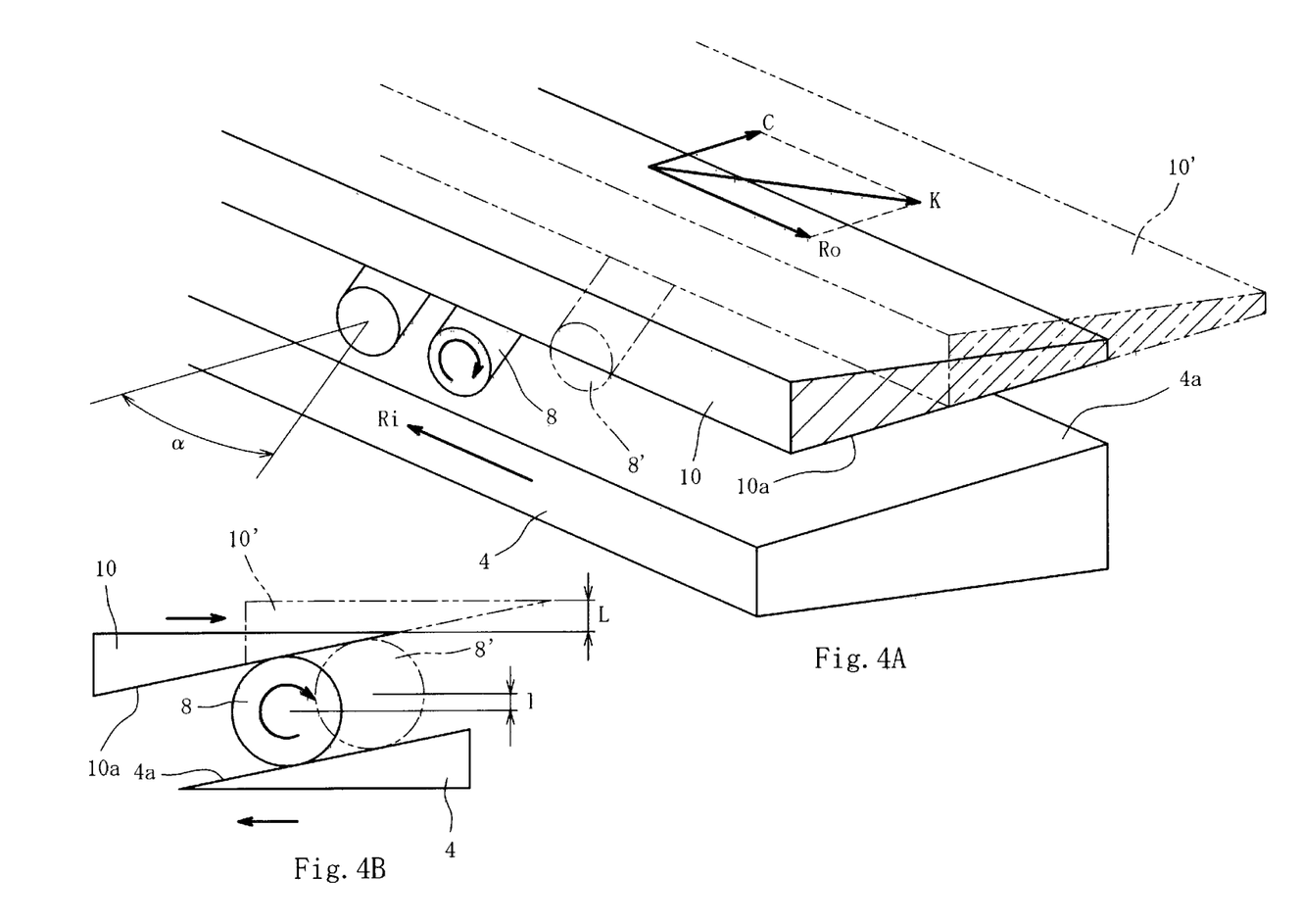
FIG. 4(a) is a developed view of an input track surface and an output track surface.
FIG. 4(b) is a schematic diagram of the input track surface and output track surface viewed with the rollers engaged.

Operations performed by the clutch device 1, which is configured as described above, will now be described with reference to FIG. 3 and FIG. 4. FIG. 3(a) is a half sectional view of the clutch device 1 viewed with the input rotary member (inner ring 4) moved in the axial direction. FIG. 3(b) is a half sectional view of the clutch device 1 viewed with the rollers 8 engaged. FIG. 4(a) is a developed view of the input track surface 4a and the output track surface 10a. FIG. 4(b) is a schematic diagram of the input track surface 4a and the output track surface 10a viewed with the rollers 8 engaged. In FIGS. 4(a) and 4(b), the rollers 8' and the outer ring 10' (two-dot chain lines) represent a state where the rollers 8 and the outer ring 10 are rotated by the torque of the inner ring 4.

As shown in FIG. 3(a), when the camshaft 3 is moved in one axial direction (leftward in FIG. 3(a)) to let the pin 3b move the inner ring 4 toward the stopper 5, the distance between the input track surface 4a and the output track surface 10a decreases to bring the rollers 8 into linear contact with the input track surface 4a and the output track surface 10a. When the inner ring 4 rotates in one direction (in the direction of arrow Ri in FIGS. 2 and 4(a)), the rollers 8 rotate along the input track surface 4a while rotating on their own axis (clockwise in FIG. 4(b)), as shown in FIG. 4(b). As the rollers 8 rotate, the rollers 8 and the output track surface 10a are displaced (l and L) in the radial direction (up-down direction in FIG. 4(b)) so that the output track surface 10a moves in the direction of arrow K (see FIG. 4(a)) while elastically deforming in the radial direction. As a result, the outer ring 10 not only rotates in the direction of arrow Ro shown in FIG. 4(a), but also relatively moves in the direction of arrow C, which is in the axial direction (in the direction of decreasing the distance between the input track surface 4a and the output track surface 10a (hereinafter referred to as the inter-track distance)). As the axial movement of the inner ring 4 is restricted by the stopper 5 and the pin 3b, the outer ring 10 moves in the direction of decreasing the inter-track distance (rightward in FIG. 3(b)) against the pressing force of the disc spring 11 as shown in FIG. 3(b). Consequently, the rollers 8 engage with the input track surface 4a and the output track surface 10a to transmit the motive power from the inner ring 4 to the outer ring 10.

When the relative axial movement of the outer ring 10 is inhibited at a predetermined position (the position of the stopper 6), the axial inter-track distance stops decreasing, thereby causing the outer ring 10 to elastically deform in the radial direction. Therefore, a torque higher than a torque (predetermined value) transmittable by the current axial inter-track distance cannot be transmitted. As a result, the inner ring 4 and the outer ring 10 can be relatively rotated by a torque higher than the predetermined value. In other words, the clutch device 1 functions as a torque limiter.

When the inner ring 4 relatively rotates in an opposite direction (in a direction opposite the direction of arrow Ri in FIG. 2) with respect to the outer ring 10 in a situation where the rollers 8 are engaged with the input track surface 4a and the output track surface 10a (see FIG. 3(b)), the pull-away force of the rollers 8 (the force of increasing the inter-track distance) acts to relatively move the inner ring 4 and the outer ring 10 in the axial direction and away from each other. As the axial movement of the inner ring 4 is restricted by the stopper 5 and the pin 3b, the outer ring 10 moves in the direction of increasing the inter-track distance (leftward in FIG. 3(a)) as shown in FIG. 3(a). The pressing force of the disc spring 11 helps the outer ring 4 move in one axial direction (leftward in FIG. 3(a)). This causes the rollers 8 to disengage from the input track surface 4a and the output track surface 10a. Consequently, the inner ring 4 and the outer ring 10 can rotate relatively (rotate freely).

When the camshaft 3 is moved in the other axial direction (rightward in FIG. 3(a)) to stop the pin 3b from pressing the tilted surface 4c in a situation where the rollers 8 are disengaged from the input track surface 4a and the output track surface 10a (see FIG. 3(a)), the pressing force of the disc spring 7 moves the inner ring 4 toward the stopper 6. As this inhibits the rollers 8 from coming into contact with at least one of the input track surface 4a and the output track surface 10a, the rollers 8 cannot engage with the input track surface 4a and the output track surface 10a. As a result, the motive power transmission from the inner ring 4 to the outer ring 10 can be blocked.

Figure 5A:
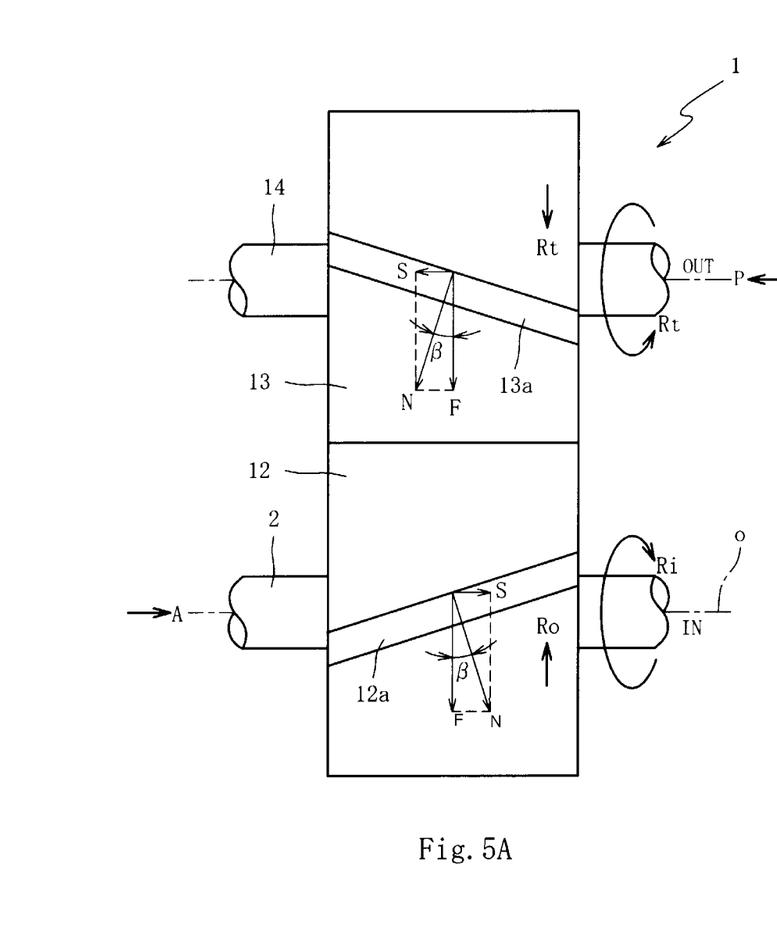
FIG. 5(a) is a schematic diagram illustrating rotation directions and a thrust direction in a situation where the first gear and the second gear are engaged.

Referring now to FIG. 5(a), the rotation directions of the first gear 12 and the second gear 13 and the axial force (thrust) exerted on the first gear 12 will be described. FIG. 5(a) is a schematic diagram illustrating the rotation directions and a thrust direction in a situation where the first gear 12 and the second gear 13 are engaged. FIG. 5(a) shows the first gear 12, which is formed on the outer circumferential surface of the outer ring 10, and the second gear 13, which engages with the first gear 12, and does not show, for example, the inner ring 4 and the rollers 8. Further, the teeth 12a and 13a formed respectively on the first gear 12 and the second gear 13 are partly omitted from FIG. 5(a).

When the inner ring 4 relatively rotates in one direction (in the direction of arrow Ri in FIG. 5(a)) with respect to the outer ring 10 as shown in FIG. 5(a) in a situation where the rollers 8 are in linear contact with the input track surface 4a and the output track surface 10a, the rollers 8 engage with the input track surface 4a and the output track surface 10a to transmit the motive power from the inner ring 4 to the outer ring 10 as described earlier (arrow Ro denotes the rotation direction of the outer ring 10). When the motive power transmitted to the outer ring 10 drives to rotate the first gear 12 (the rotation direction is indicated by arrow Ro), the rotation is transmitted to the second gear 13 and to the rotation shaft 14 (the rotation direction is indicated by arrow Rt), and axial force oriented in a predetermined direction (in the direction of arrow A or arrow P in FIG. 5(a)) is generated on the second gear 13 (driven gear) and the first gear 12, respectively. The tooth traces of the first gear 12 and the second gear 13 are oriented so that the direction of axial force exerted on the first gear 12 (the direction of arrow A in FIG. 5(b)) is the same as the direction of axial transport of the outer ring 10 for decreasing the distance between the input track surface 4a and the output track surface 10a (the direction of arrow A in FIG. 5(*a*)).

Here, the axial component force of friction force generated between the rollers 8 and the input track surface 4a and the output track surface 10a suppresses the axial pull-in force of pulling the inner ring 4 and the outer ring 10 toward each other when the rollers 8 engage with the input track surface 4a and the output track surface 10a, and results in the failure to transmit a predetermined torque from the inner ring 4 to the outer ring 10. Meanwhile, according to the clutch device 1, the outer ring 10 is prompted to move in the axial direction to decrease the distance between the input track surface 4a and the output track surface 10a due to not only the pull-in force generated by the rotation of the rollers 8 to pull the input track surface 4a and the output track surface 10a toward each other but also the axial force generated by the reaction force of the second gear 13. This makes it possible to increase the axial pull-in force of pulling the inner ring 4 and the outer ring 10 toward each other. Consequently, the clutch device 1 can properly transmit a predetermined torque.

On the other hand, when the inner ring 4 relatively rotates in the opposite direction (in a direction opposite the direction of arrow Ri in FIG. 5(*a*)) with respect to the outer ring 10 in a situation where the rollers 8 are engaged with the input track surface 4a and the output track surface 10a, the second gear 13 acts as a driving gear while the first gear 12 acts as a driven gear. In this instance, axial force oriented in an opposite direction (in a direction opposite the direction of arrow A or arrow P in FIG. 5(*a*)) is generated on the second gear 13 and the first gear 12, respectively. The axial force is exerted the moment the second gear 13 acts as a driving gear with the first gear 12 acting as a driven gear. Therefore, the axial force is exerted on the outer ring 10 before the pull-away force is generated by the rotation of the rollers 8 to pull the inner ring 4 and the outer ring 10 away from each other. As a result, the distance between the input track surface 4a and the output track surface 10a can be increased early. This makes it possible to promptly disengage the rollers 8 from the input track surface 4a and the output track surface 10a.

Further, when the inner ring 4 and the outer ring 10 rotate relatively (rotate freely), not only the pull-away force generated by the rotation of the rollers 8 to pull the input track surface 4a and the output track surface 10a away from each other, but also the axial force generated in an opposite direction (in a direction opposite the direction of arrow A in FIG. 5(*a*)) by the first gear 12 and the second gear 13 is exerted on the outer ring 10. As a result, the axial force exerted on the first gear 12 can increase the distance between the input track surface 4a and the output track surface 10a by a greater amount than the amount by which the pull-away force generated by the rotation of the rollers 8 pulls the inner ring 4 and the outer ring 10 away from each other. This makes it possible to reduce the torque required when the inner ring 4 and the outer ring 10 rotate relatively (rotate freely).

Referring further to FIG. 5(*a*), the friction between the tooth surfaces of the first gear 12 and the second gear 13 will now be discussed. When the first gear 12 rotates in one direction (in the direction of arrow Ro in FIG. 5(*a*)), circumferential force N in a plane perpendicular to the axis is exerted on the tooth surface of the first gear 12 due to the reaction force of the second gear 13. Meanwhile, the circumferential force N in a plane perpendicular to the axis is also exerted on the tooth surface of the second gear 13, which is a driven gear. The circumferential force N is divided into tangential force F perpendicular to the central axis o and axial force S parallel to the central axis o. If the torsional angle of the first gear 12 is β, the axial force S is expressed by Equation (1).

$$S = N \cdot \sin \beta \qquad \text{Equation (1)}$$

If the friction coefficient between the tooth surfaces of the first gear 12 and the second gear 13 is μ, the axial component force S' of friction force generated by the tooth surface of the second gear 13 is expressed by Equation (2).

$$S' = \mu N \cdot \cos \beta \qquad \text{Equation (2)}$$

In order to move the outer ring 10 in the axial direction (in the direction of arrow A in FIG. 5(*a*)) for the purpose of decreasing the distance between the input track surface 4a and the output track surface 10a, it is necessary to move the first gear 12 in the axial direction (in the direction of arrow A in FIG. 5(*a*)) with respect to the second gear 13. To move the first gear 12 in the above-mentioned manner, it is necessary that the absolute value of the axial force S be greater than the absolute value of the axial component force S' of friction force. In other words, it is necessary that Equation (3) be established. As S>0 and S'>0, absolute value symbols are omitted from Equation (3).

$$S - S' > 0 \qquad \text{Equation (3)}$$

When Equations (1) and (2) are substituted into Equation (3), Equation (4) is obtained.

$$\mu < \tan \beta \qquad \text{Equation (4)}$$

When the friction coefficient μ between the tooth surfaces of the first gear 12 and the second gear 13 and the torsional angle β of the first gear 12 are set as indicated by Equation (4), the first gear 12 can be moved in the axial direction (in the direction of arrow A in FIG. 5(*a*)) with respect to the second gear 13. The outer ring 10 can then be moved in the axial direction (in the direction of arrow A in FIG. 5(*a*)) to decrease the distance between the input track surface 4a and the output track surface 10a. This makes it possible to prevent the axial pull-in force, which pulls the inner ring 4 and the outer ring 10 toward each other, from being suppressed by the friction between the tooth surfaces of the first gear 12 and the second gear 13. Consequently, the clutch device 1 can properly transmit a predetermined torque.

Further, according to the clutch device 1, the axis line of the rotation shaft 14 of the second gear 13 does not coincide with the central axis o. Therefore, the turning radius of the second gear 13 can be decreased as compared to a case where the second gear 13 is formed, for instance, of an internally-toothed gear concentric with the first gear 12. This makes it possible to not only reduce the size of the clutch device 1 but also simplify its structure.

Furthermore, the torque of the outer ring 10 (output rotary member) is transmitted by the gears (first gear 12 and the second gear 13). Therefore, the area of a contact surface to which the torque is transmitted can be increased as compared to a case where the torque is transmitted, for instance, by a ball spline or by a pin. As a result, surface pressure (tooth surface pressure) can be reduced. This makes it possible to increase the durability of a portion (contact surface) to which the torque is transmitted.

Moreover, the first gear 12 and the second gear 13 are formed of a helical gear. Therefore, the first gear 12 and the second gear 13 not only exhibit higher strength than a spur gear of the same size, but also transmit rotary power quietly. Besides, the first gear 12 and the second gear 13 can transmit high-speed rotation. In addition, the first gear 12 and the second gear 13 excel in flexibility as the combination of the numbers of their teeth is not limited.

Figure 5B:
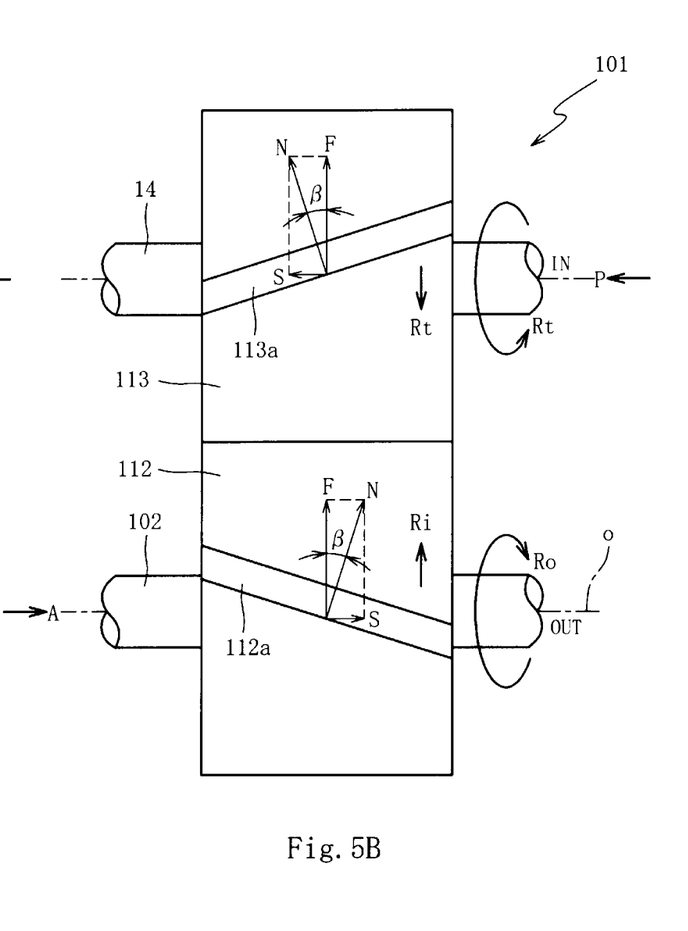
FIG. 5(b) is a schematic diagram illustrating the rotation directions and the thrust direction in a situation where the first and second gears of the clutch device according to a second embodiment are engaged.

Referring now to FIG. 5(b), a clutch device 101 according to a second embodiment of the present invention will be described. The clutch device 101 according to the second embodiment differs from the clutch device 1 according to the first embodiment in that motive power is input from a second gear 113 to a first gear 112 while the outer ring 10 is used as an input rotary member with the inner ring 4 used as an output rotary member, and that the torsion direction of tooth trace of the first gear 112 (or the second gear 113) is different from the torsion direction of tooth trace of the first gear 12 (or the second gear 13) of the clutch device 1 according to the first embodiment. Elements identical with those of the first embodiment are designated by the same reference signs and will not be redundantly described.

As shown in FIG. 5(b), when the rotation shaft 14 and the second gear 113 rotate in the direction of arrow Rt, the first gear 112 is driven in the direction of arrow Ri to rotate the outer ring 10 in the direction of arrow Ri. When the rollers 8 engage with the inner ring 4 and with the outer ring 10, a shaft 102 outputs rotary power that is oriented in the direction of arrow Ro.

When the first gear 112 is driven in the direction of arrow Ri, the circumferential force N in a plane perpendicular to the axis is exerted on the tooth surface of the first gear 112 (teeth 112a) due to the reaction force of the second gear 113 (teeth 113a). Hence, axial force S (the direction of arrow A) is generated on the first gear 112 and on the outer ring 10. The clutch device 101 is similar to the clutch device 1 in that the torsion direction of tooth trace of the first gear 112 and the second gear 113 is set so that the direction of axial force exerted on the first gear 112 (the direction of arrow A) is the same as the axial direction in which the outer ring 10 moves to decrease the inter-track distance.

The present invention has been described with reference to the foregoing embodiments. However, the present invention is not limited to the foregoing embodiments. It is to be easily understood that various improvements and modifications can be made without departing from the spirit and scope of the present invention. For example, numerical values (for example, the number and dimensions of each element) mentioned to describe the foregoing embodiments are merely illustrative and not restrictive. It is obvious that the other numerical values may be adopted.

The foregoing embodiments have been described on the assumption that the first gear 12 or 112 is disposed on the outer circumference of the outer ring 10. However, the present invention is not limited to such a configuration. As an alternative, it is possible to extend the axial end face of the inner ring 4 in the axial direction, dispose the extended portion (not shown) at a place that is positioned axially outward from the axial end face of the outer ring 10, and dispose the first gear 12 or 112 on the extended portion. When the second gear 13 or 113 is disposed to engage with the first gear 12 or 112, the advantageous effects provided by the foregoing embodiments can be obtained.

The foregoing embodiments have been described on the assumption that the cylindrical rollers 8 are employed while the input track surface 4a and the output track surface 10a are formed of a one-sheeted hyperboloid. However, the present invention is not limited to such a configuration. It is obvious that the input track surface 4a and the output track surface 10a and the rollers 8 according to an alternative embodiment may be employed. In one alternative embodiment, for example, the rollers 8 may be conically shaped while the input track surface 4a and the output track surface 10a are formed of a one-sheeted hyperboloid. In another alternative embodiment, for example, the rollers 8 may be shaped like a drum, a barrel, or a cylinder while the input track surface 4a and the output track surface 10a are cylindrically shaped.

The foregoing embodiments have been described on the assumption that the first gear 12 or 112 and the second gear 13 or 113 are formed of a pair of helical gears (inclined-tooth gears). However, the present invention is not limited to such a configuration. It is obvious that alternative gears may be employed as far as their teeth are formed to generate axial force (thrust) with their tooth trace oriented non-parallel to the central axis o. For example, bevel gears and screw gears may be used as the alternative gears.

The foregoing embodiments have been described on the assumption that the rotation shaft 14 of the second gear 13 or 113 does not coincide with the central axis o. However, the present invention is not limited to such a configuration. It is obvious that the second gear 13 or 113 may be internally toothed to permit the axis line of the rotation shaft 14 of the second gear 13 or 113 to coincide with the central axis o.

In the foregoing embodiments, the first gear 12 or 112 and the second gear 13 or 113 are formed of a pair of helical gears. Thus, the foregoing embodiments have been described on the assumption that the rotation shaft 14 of the second gear 13 or 113 is disposed in parallel with the central axis o. However, the present invention is not limited to such a configuration. The positional relationship between the central axis o and the axis line of the rotation shaft 14 of the second gear 13 or 113 may be set as appropriate depending on the type of the first gear 12 or 112 and the second gear 13 or 113. If, for instance, bevel gears are employed, the axis line of the rotation shaft 14 of the second gear 13 or 113 may be disposed to intersect with the central axis o. If screw gears are employed, the rotation shaft 14 of the second gear 13 or 113 may be disposed to be discrepant from the central axis o.

The foregoing embodiments have been described on the assumption that the second gear 13 or 113 engages with the first gear 12 or 112 and that the rotation shaft 14 of the second gear 13 or 113 acts as an output shaft. However, the present invention is not limited to such a configuration. For example, it is obviously possible to employ a planetary gear train in which the first gear 12 or 112 acts as a sun gear while the second gear 13 or 113 is formed of a plurality of pinion gears and a ring gear (internally toothed) is disposed outside the second gear 13 or 113. It is also possible to employ a planetary gear train in which the first gear 12 or 112 (ring gear) is disposed with the outer ring 10 extended in the axial direction, the second gear 13 or 113 is formed of a plurality of pinion gears, and a sun gear is disposed inside the second gear 13 or 113. This planetary gear train may be of a single pinion type or of a double pinion type. In the above case, it is possible to assign the orbital motion of a pinion gear as an output or assign the rotation of the ring gear or of the sun gear as an output.

The foregoing embodiments have been described on the assumption that a cam is used to move the inner ring 4 in the axial direction in order to inhibit the rollers 8 from engaging with the inner ring 4 and the outer ring 10. However, the present invention is not limited to such a configuration. It is obviously possible to inhibit the rollers 8 from engaging with the inner ring 4 and the outer ring 10 by using a means of moving the outer ring 10 in the axial direction.

The foregoing embodiments have been described on the assumption that the clutch device has a transport means of moving the inner ring 4 in the axial direction, which includes the camshaft 3, the pin 3*b* that appears due to the cam face 3*a* of the camshaft 3 and interferes with the tilted surface 4 of the inner ring 4, and the disc spring 7 that presses the inner ring 4 in the axial direction. However, the present invention is not limited to such a configuration. It is obvious that an alternative transport means may be employed. A well-known means, such as a cylinder that uses fluid pressure or an electromagnet that uses magnetic force, may be used as the alternative transport means of moving the inner ring 4 or the outer ring 10 in the axial direction.

The foregoing embodiments have been described on the assumption that the disc spring 7 or 11 is used to press the inner ring 4 and the outer ring 10 in the axial direction. However, the present invention is not limited to such a configuration. It is obvious that an alternative pressing member may be employed. For example, a compression coil spring or a rubber-like elastic body may be used as the alternative pressing member.

In the foregoing embodiments, the disc spring 11 is disposed to press the outer ring 10 in such a manner as to increase the distance between the input track surface 4*a* and the output track surface 10*a* (move the outer ring 10 toward the stopper 5). However, when the outer ring 10 and the inner ring 4 relatively rotate, the outer ring 10 moves toward the stopper 5 due to the rotation of the rollers 8 and the reaction force of the second gear 13. Therefore, the disc spring 11 may be omitted.

The invention claimed is:

1. A clutch device comprising:
   an input rotary member;
   an output rotary member capable of relatively moving in an axial direction with respect to the input rotary member;
   an output track surface formed on one of inner and outer circumferential surfaces of the output rotary member;
   an input track surface formed on one of inner and outer circumferential surfaces of the input rotary member and disposed opposite the output track surface;
   a plurality of rollers disposed between the input track surface and the output track surface and tilted at a predetermined angle from a plane including a central axis of the input rotary member;
   a first gear formed integrally with or coupled to the input rotary member or the output rotary member and toothed so that a tooth trace is non-parallel to the central axis; and
   a second gear that engages with the first gear;
   wherein an axial force exerted on the first gear due to a reaction force of the second gear is oriented in the axial direction in which the input rotary member or the output rotary member moves to decrease a distance between the input track surface and the output track surface;
   a stopper that inhibits the input rotary member and the output rotary member from axially moving at a position where the input track surface and the output track surface are incapable of engaging with the rollers, and the axial force generated on the first gear and the second gear with the second gear acting as a driving gear and the first gear acting as a driven gear is exerted on the input rotary member and the output rotary member before pull-away force is generated by rotation of the rollers to pull the input rotary member and the output rotary member away from each other.

2. The clutch device according to claim 1, wherein the first gear is set so that an absolute value of the axial force exerted on the first gear due to the reaction force of the second gear is greater than an absolute value of the axial component force of friction force that is exerted in a direction opposite the direction of the axial force due to friction between tooth surfaces of the first and second gears.

3. The clutch device according to claim 1, further comprising a transporter that transports the input rotary member or the output rotary member to an axial position at which the rollers cannot engage with the input track surface and the output track surface.

4. The clutch device according to claim 1, wherein an axis line of a rotation shaft of the second gear does not coincide with the central axis.

* * * * *